United States Patent [19]

Furia

[11] 3,976,797

[45] Aug. 24, 1976

[54] LOW CORROSION AZO COLORANTS

[75] Inventor: Thomas E. Furia, San Jose, Calif.

[73] Assignee: Dynapol, Palo Alto, Calif.

[22] Filed: Mar. 10, 1975

[21] Appl. No.: 556,601

[52] U.S. Cl.............................. 426/131; 8/DIG. 7; 260/144; 424/226; 426/250; 426/540
[51] Int. Cl.²......................................... A23L 1/275
[58] Field of Search................. 426/131, 250–252, 426/540; 8/DIG. 7; 260/144; 424/226

[56] References Cited
UNITED STATES PATENTS
3,278,486  10/1966  Meek................................. 260/144

FOREIGN PATENTS OR APPLICATIONS
433,507  8/1968  Japan................................. 260/144
44-13382  6/1969  Japan................................. 260/144

OTHER PUBLICATIONS

Handbook of Food Additives, Furia Chem. Rubber Co., 1968, pp. 32, 33, 42, 43.
Index Chemicus, 34, 117535, 117536, 1969, Ida et al.
Derwent Jap. Patents Report, 5, No. 39, pp. 515–516, (Nov. 1, 1966).
Amer. Soft Drink J., Feb., 1966, pp. 36, 62.
Food Eng., Jan., 1965, 4 pages.
J. Pharm. Soc. Japan, 89, pp. 517–530, (1969).

*Primary Examiner*—Steven L. Weinstein
*Attorney, Agent, or Firm*—William H. Benz

[57] ABSTRACT

Azo colorants, when employed in polymeric form, present substantially reduced corrosivity to metals.

14 Claims, No Drawings colorant is used to color foods, beverages and pharmaceuticals.

DETAILED DESCRIPTION OF THE INVENTION

The Azo Colorants

Polymeric azo colorants are used in this invention. A polymeric azo colorant contains two parts: an azo chromophore part, indicatable by Ch, which supplies the color, and a nonchromophore part, indicatable by B, which joins the chromophores into a polymer. The resulting polymeric colorants may assume the structure —(ChB)$_n$— or the structure $$\begin{array}{c} B \\ | \\ (Ch)_n \end{array}$$

wherein $n$ is an integer greater than 1, such as from 2 to 4,000, especially 10 to 3000.

Although the average molecular weights which correspond to these values of $n$ of course depend upon the size of B and Ch, it is generally preferred to employ polymeric colorants of molecular weight 1,000 to 1,000,000 so long as they do contain a plurality of chromophores. A monomeric colorant meeting this molecular size should not yield the effect of the invention. A preferred molecular weight range is from 1,000 to 250,000.

The chromophores employed, Ch, are organic azo moieties which in their monomeric state are colorants. Exemplary chromophores include such azo dyes as CI Acid Yellow #36 -

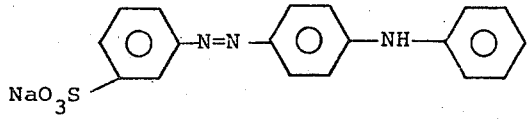

CI Mordant Orange #1 -

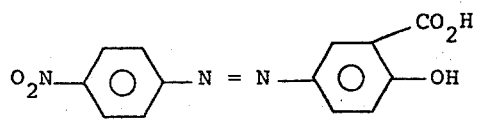

FD&C Yellow #6 -

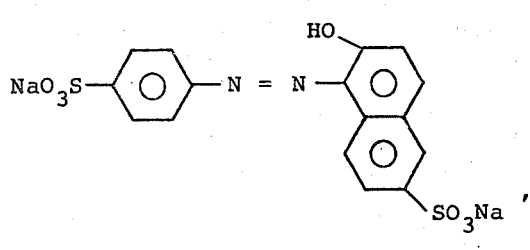

FD&C Yellow #5 -

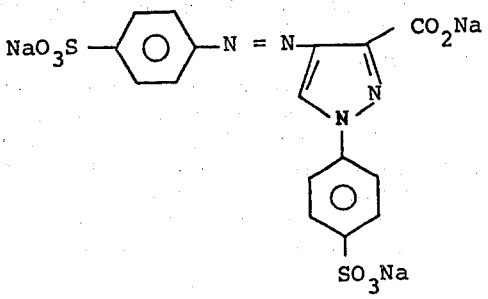

FD&C Red #2 -

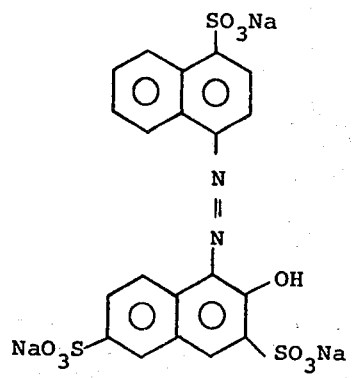

FD&C Red #40 -

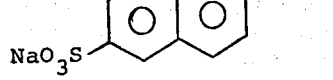

LOW CORROSION AZO COLORANTS

BACKGROUND OF THE INVENTION

1. Field of the Invention

This invention relates to azo colorants such as azo dyes and their use in contact with metal surfaces. In one particular application, this invention finds use in colored foodstuffs and beverages.

2. The Prior Art

Azo dyes are well known materials. A wide variety of "azo" compounds are known. In a general sense, an azo compound is a compound having a nitrogen-nitrogen double bond (—N=N—) in its structure. Among azo compounds known in the art may be found so-called "monoazo" compounds — that is, compounds containing one —N=N— bond, such as tartrazine,

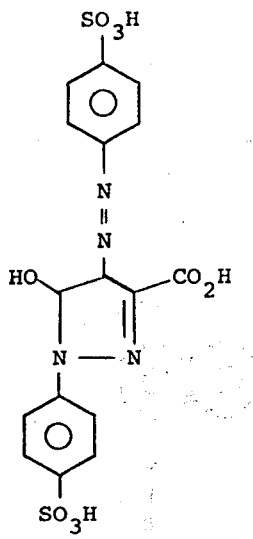

and "polyazo" compounds — that is, compounds which within their unit chemical structure contain a plurality of azo bonds, such as CI Direct Brown 138,

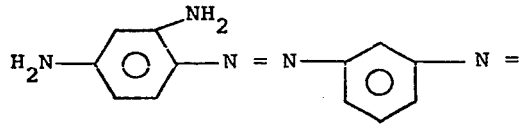

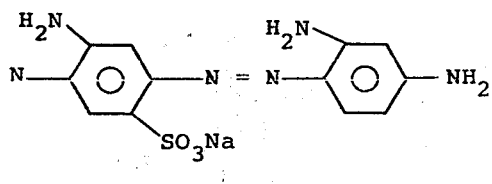

Many azo compounds have the property of being colored. This property has led to the wide adoption of azo compounds as dyes and colorants.

Conventional mono- and polyazo compounds have an undesirable property which can interfere with their use as colorants, however. They are corrosive to a range of common metals — most importantly, tin, zinc, aluminum and steel, but also alloys thereof. Thus, when a material containing an azo compound, such as a colorant, is contacted with a surface made of or coated with these metals, corrosion occurs. This leads to contamination of the azo compound-containing material with corrosion products, such as metal flakes and ions, and to destruction of the metal surface. This rate of corrosion is a direct function of the concentration of azo compound, a fact which leads to less-than-desired amounts of azo compounds being added in an attempt to reduce corrosion.

This corrosion problem is most apparent in water-containing materials, especially foods and beverages. Beverages, such as colas and fruit-flavored soft drinks, generally are colored by azo colorants. This can lead to corrosion of food and beverage handling apparatus, apparatus which should be maintained scrupulously clean and noncorroded; and to unhealthful contamination of the foods and beverages. Moreover, this problem becomes even more acute in the case of canned foods and beverages. Can and metal container manufacturers are aware of this problem and often refuse to guarantee the soundness of their containers for extended periods of azo compound usage. This leads to short shelf lives for many common canned products, and to the use of lower amounts of colorants. As an example of this phenomenon, a comparison of canned and bottled orange soda generally reveals that the canned orange soda is much paler in color and less desirable.

Substitution of non-azo colors often is not a suitable solution to the problem, as many colored non-azo compounds are toxic, do not have desired properties, or are not approved by regulatory agencies for use in foods. A partial solution has been to coat the metal surface with polymeric organic resins to physically prevent the azo colorants from contacting the metal surfaces. This approach is expensive unless thin coatings are used. These thin coatings generally have imperfections and pin holes which expose the metal surface to the azo colorant and corrosion.

STATEMENT OF THE INVENTION

It is an object of this invention to minimize the metal corrosion problem presented by prior azo compounds.

Another object of this invention is to provide materials containing azo colorants which are of lower metal corrosivity than previous azo-colored materials.

Yet a further object is to make available a low corrosion process for azo-coloring materials.

One additional object is to provide azo-colored foodstuffs and beverages which are of lower metal corrosion than conventional azo-colored foodstuffs and beverages.

Another object is to provide azo-colored foods and beverages in metal cans and containers which have increased container life compared to conventional materials.

These objects are met by the present invention, which involves the use of polymeric versions of azo compounds as colorants. Metals subject to corrosive attack by azo dyes when placed in contact with materials containing a coloring amount of a polymeric azo dye present substantially reduced rates of corrosion than when contacted with equivalent amounts of monomeric azo dyes. Thus, the combination of a surface of an azo-corrodible metal in contact with a polymeric azo colorant presents unexpected advantages over the prior art. In preferred embodiments, the polymeric azo Brilliant Direct Orange G (By) -

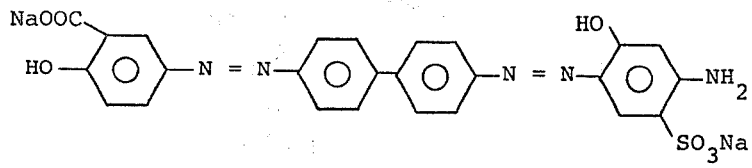

and CI No. 21590 Mordant Blue 6.

This list is intended merely to be illustrative and is not to be construed as limiting the specific azo chromophores which can be employed.

The Linking Groups, B

The chromophores are linked into polymers via linking groups, B. The B groups are organic. They provide a plurality of active groups which attach to a plurality of chromophores; or, if the chromophores are so-called "reactive chromophores", having their own reactive groups, they can merely provide active sites to which the chromophores can attach.

Examples of the first type of B include simple links providing two active groups, such as the two olefinic groups in divinylbenzene or 1,4-butadiene; the two hydroxyl groups in ehtylene glycol, or hydroquinone, or more complex links providing a large number of active groups, such as poly(1,2-butadiene), polyacrylic acid, polyethyleneimine (both linear and branched), poly-2 or 4-vinylpiperidine, polybuteneamine, polyvinylalcohol, polyvinyl(3-aminopropyl)-ether, polycyclodiallylamine, poly-2-aminoethylmethacrylate, polyvinyl(2-aminoethyl)-ether, polyacrolein, poly-2-amino-1-vinylethanol, polyepichlorohydrin, and polyvinylamine.

Examples of the second type of B include cellulose, polyethers, hydrocarbons and the like.

The linking groups may also include nonchromophoric groups which modify the polymer's properties; for example, its solubility in water or oil.

Preparation of the Colorants

These polymeric colorants can be made by methods known in the art. As this invention involves an application of these colorants rather than the colorants per se, a detailed description of the colorants will not be provided. The Examples contain a variety of representative preparations, however, and additional information on the preparation of representative colors may be found in U.S. Pat. No. 3,920,855 of Dawson et al. issued on Nov. 18, 1975 which is incorporated herein by reference.

Use of the Colorants

In accord with this invention, polymeric azo colorants are used in environments which contain corrodible metal surfaces. Azo-corrodible metal surfaces are defined to include surfaces or iron, steel, tin, aluminum, zinc, and alloys comprising these materials. These surfaces can take the form of metal containers, metal processing equipment, metal pipes, and the like. In a preferred application the metal surfaces comprise containers such as cans having steel, aluminum, tin or zinc surfaces. The polymeric azo colorants are present in a coloring amount as a solution, preferably an aqueous solution, or they may be present as an admixture of colorants in a solid substrate. In a very common and preferred application, the polymeric colorants are admixed with a foodstuff, a beverage, or a pharmaceutical composition. These materials include, for example, frozen desserts, confections, soft drinks such as orange and cherry soda, wines, fruit juices, elixers, cough medicines and tonics, as well as concentrates of soft drinks and juices and the like. In use, colorants are rarely added to finished products in concentrations greater than about 0.01% by weight or in concentrations less than about 5 parts per million by weight. When solutions of azo colorants are used in dyeing of paper or fabrics, the azo colorant is within this range as well.

The invention will be further described by the following Examples. These are not to be construed as limitations on the scope of the present invention, which is instead defined by the appended claims.

EXAMPLES

As the polymeric azo colorants employed in this invention are presently not widely known materials, Examples I through III depict illustrative preparation of polymeric azo colorants. Example IV shows comparative metal corrosion studies which illustrate the advantages of this invention.

EXAMPLE I

A. Methylamine, in an amount of 682 g, was charged to a 5 liter flask and cooled to 6°C. 4-acetamido-sulfonylchloride,

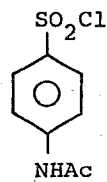

in an amount of 1,000 g was then gradually added and the mixture stirred for 2 hours. The solid product was recovered by filtration and then dried. It was then recrystallized from water and dried. A 250 g aliquot was then dissolved in 440 ml of 10% sodium hydroxide at 70°C yielding a solution which upon freeze-drying yielded

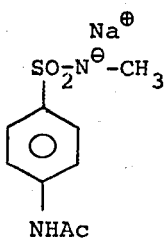

as a final product.

B. A solution of 33.4 g of Herchlor H™ brand polyepichlorohydrin (mw 250) in one liter of DMF was combined with 95 g of the product of part A at room temperature and then heated to 100°C with stirring for 72 hours, followed by 12 hours at 150°C. This yielded a product which upon analysis and recovery was found to have the formula

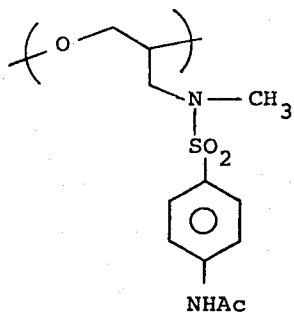

wherein $n$ had a value of about 5.

C. A 40 g aliquot of the material of part B was dissolved in one liter and concentrated hydrochloric acid; a liter of methanol was added followed by 2 liters of water. The mixture was gradually heated to 90°C and there maintained for one hour. It was then cooled and 112 ml of 1 Normal sodium hydroxide solution was added. The solution was divided into two portions.

D. One of the two portions of the solution of part C was combined at 20°C with 41.2 g of Schaeffer's salt,

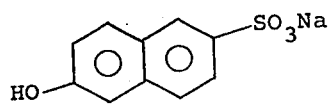

in 3.5 liters of 5% by weight sodium hydroxide. This yielded a solution of a polymeric colorant having the formula

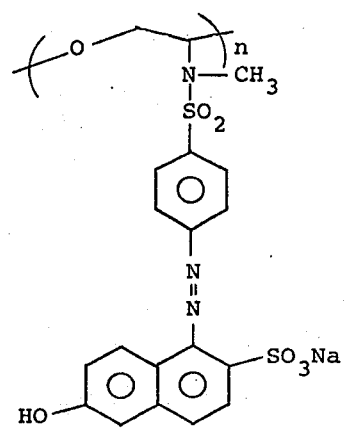

wherein $n$ was about 5. This material was recovered by drying. It had the same visual color as Sunset Yellow (FD&C Yellow No. 6).

EXAMPLE II

The second of the two portions of solution prepared in Example I, part C, was mixed with an aqueous solution of 41.8 g of pyrazolone-T,

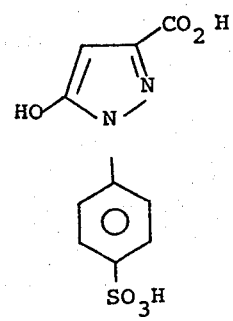

in 2.4 liters of 10% sodium hydroxide. The mixture was maintained at 20°C and a polymeric form of FD&C Yellow No. 5 (Tartrazine) was formed having the structure

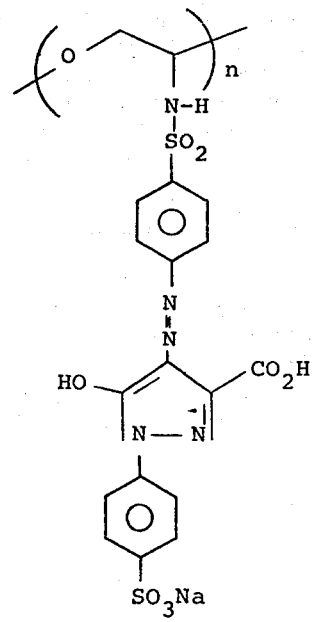

EXAMPLE III

A. A 71.1 g portion of polyacrylic acid (Good-Like K-732-molecular weight 7,000) was dissolved in 250 ml of concentrated sulfuric acid with stirring. 202 ml of polyacrylic acid solution was mixed with 50 ml of benzene and then stirred at 40°C while 408 ml of 1.97 M hydrazoic acid ($HN_3$) in benzene was added dropwise with stirring over a period of 8 hours. The reaction, a Schmidt rearrangement, was continued at 40°C for about 10.5 additional hours. The mixture was then stripped of benzene to give an almost clear yellow solution, which was cooled to 0°C. Methanol (500 ml) was then added. The resulting emulsion was centrifuged at high speed for 20 minutes to separate a precipitate. The precipitate was dissolved in 150 ml of water and gave a yellow solution. This solution was precipitated by addition to methanol, the precipitate being collected and dried. 38.4 g of an off-white solid was recovered. Elemental analysis showed this product to be a copolymer of acrylic acid (mole ratio 0.43) and vinylamine (mole ratio 0.57).

B. 20 g of the product of part A was dissolved in 60 ml of water. An 8% solution of sodium hydroxide was then dripped into a pH of 8. 53.7 g of N-acetylsulfanilyl chloride was added in small portions over a period of 7 hours. The pH of the solution was increased throughout the addition in order to keep the polymer in solution, gradually increasing from an initial pH of about 8 to a final pH of about 12.5. After completing the addition of N-acetylsulfanilyl chloride, conditions were maintained constant for 2½ hours and then the cloudy yellow solution which resulted was filtered. The resulting clear yellow solution was dripped into a stirred 25% solution of acetic acid to give a white precipitate, which was collected, rinsed with water, and dried in vacuo to give 26.6 g of a white powder.

10.0 Grams of the white powder was suspended in 40 ml of 10% aqueous hydrochloric acid, and this mixture was heated at reflux with stirring under argon for 1 hour (to hydrolyze the N-acetyl group). A clear yellow solution resulted. This solution was cooled and dripped warm into a solution of 18 g of sodium acetate in 48 g of 1:1 ice/water mixture. The resulting slurry was filtered and washed with dilute aqueous acetic acid (pg 3), resuspended in pH 3 acetic acid, and refiltered. After drying in vacuo, 8.5 g of a fine white powder was recovered, which upon NMR analysis was shown to be the following polymeric sulfanilamide,

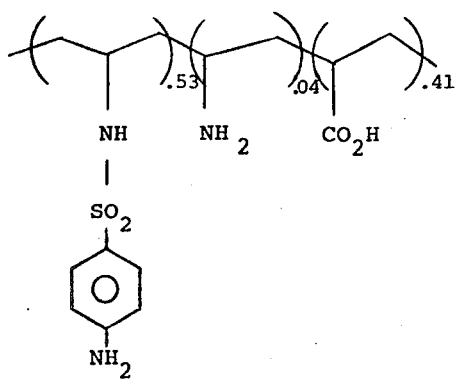

C. 50 Grams of the polysulfanilamide product of part B was suspended in 250 ml of water. Addition of 75 ml of 10% hydrochloric acid followed by 18 ml of 1.0 N aqueous $NaNO_2$ yielded a solution positive to starch-KI paper. About 0.3 g of sulfanilic acid was added to yield a negative starch-KI test. This product was dripped into a solution of 4.85 g Schaeffer's salt in 150 ml of $H_2O$ and 112 ml of 10% NaOH to yield a solution of the polymeric azo colorant,

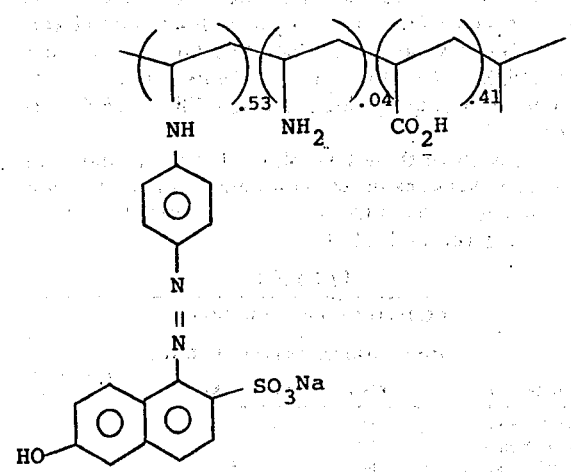

The colorant had the color of Sunset Yellow (FD&C Yellow No. 6). It was recovered by precipitation, purified by dialysis, redissolved and lyophilized.

Example IV

The corrosivity to metals of the polymeric colorants of Examples I, II and III (herein Color I, Color II and Color III, respectively) were compared with the corrosivity of corresponding monomeric azo colorants. As a test medium, a simulated carbonated beverage was selected. The following colorants were tested:
Color I
Color II
Color III
FD&C Yellow No. 5, Certification No. Y8059
FD&C Yellow No. 6, Certification No. T7338

One pint samples of bottler's syrup suitable for 1:5 dilution with carbonated water were prepared as follows:

| | |
|---|---:|
| Sugar syrup (Liquicane T-50 C&H Sugar Co.)* | 468.80 grams |
| Dionized water | 141.70 grams |
| Citric Acid (crystal, monohydrate) | 3.35 grams |
| Sodium benzoate | 0.443 grams |
| Colorant | (as needed to yield 30 or 60 ppm in the final product) |

*Liquicane T-50 is a 41.1 Be syrup consisting of 50:50 invert sugar and sucrose with a solids content of 77+.

Citric acid together with the calculated amount of dye were dissolved in the dionized water prior to diluting the syrup. Sodium benzoate was added to the finished concentrate via 1.0 ml aqueous stock solution. The addition of water reduced the sugar solids content from 77% to 59%.

On dilution with carbonated water in a ratio of 1:5, the final test beverage contained:

| | |
|---|---|
| Sugar | 12% |
| Citric Acid | 0.11% |
| Sodium Benzoate | 0.015% |
| Dye | 30 or 60 ppm |
| pH | 2.9 |

The solutions were then subjected to polarographic study of their metal corrosivity as is described in Dean, G. E., "Food Colors — A Shelf Life Factor in Canned Soft Drinks", *The American Soft Drink Journal*, Continental Can Company, Inc., Chicago, Illinois (February 1966).

The results of these tests showed that by employing polymeric versions of azo colorants, corrosivity could be reduced by as much as 50%. A summary of these results is given in Table I.

TABLE I

CORROSIVITY OF POLY-DYES IN CANNED CARBONATED BEVERAGES

| Identification | PPM | *EPFSL (Months) | % Increase in EPFSL |
|---|---|---|---|
| FD&C Yellow 5 | 60 | 9 | — |
| FD&C Yellow 5 | 30 | 12 | — |
| FD&C Yellow 6 | 60 | 6 | — |
| FD&C Yellow 6 | 30 | 9 | — |
| Color I | 60 | 12 | 100 |
| Color I | 30 | 12 | 33 |
| Color II | 60 | 12 | 33 |
| Color II | 30 | 12 | 0 |
| Color III | 60 | 12 | 100 |
| Color III | 30 | 12 | 33 |

*EPFSL — Estimated Perforation-Free Shelf Life

What is claimed is:

1. The combination of a surface comprising a metal subject to corrosive chemical attack by nonpolymeric azo dyes in confining or retaining contact with a material containing a coloring amount of a polymeric azo dye.

2. The combination of claim 1, wherein said metal subject to corrosive chemical attack by azo dyes is steel.

3. The combination of claim 1, wherein said metal subject to corrosive chemical attack by azo dyes is aluminum.

4. The combination of claim 1, wherein said material is selected from the group consisting of foods and beverages and said surface is a surface of a steel container which confines or retains said material.

5. The combination of claim 4, wherein said steel container is a can.

6. The combination of claim 1, wherein said metal subject attack by azo dyes is selected from the group consisting of iron, aluminum, tin, zinc and nickel.

7. The combination of claim 2, wherein said surface is a surface of a container which confines or retains said material.

8. The combination of claim 6, wherein said material is selected from the groups consisting of foods, beverages, and pharmaceuticals.

9. The combination of claim 8, wherein said surface is a surface of a container which confines or retains said material.

10. In a system comprising a surface of a metal selected from the group consisting of iron, steel, zinc, tin, aluminum, and alloys thereof in retaining or confining contact with a material containing a coloring amount of an azo colorant, the improvement comprising employing a polymeric azo colorant as said azo colorant.

11. The system of claim 10, wherein said material is selected from the group consisting of foods, beverages and pharmaceuticals.

12. The system of claim 10, wherein said polymeric azo colorant has the structure

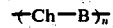

wherein Ch is azo chromophore, B is a nonchromophoric group to which the Ch groups are covalently bonded, and n is an integer of from 2 to 4000 inclusive.

13. The system of claim 10, wherein said polymeric azo colorant has the structure

wherein Ch is azo chromophore, B is a nonchromophoric group to which the Ch groups are covalently bonded, and n is an integer of from 2 to 4000 inclusive.

14. The system of claim 13, wherein said material is selected from the group consisting of foods and beverages.

* * * * *